United States Patent
Hisada et al.

(10) Patent No.: US 12,142,982 B2
(45) Date of Patent: Nov. 12, 2024

(54) STATOR AND ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Hideki Hisada, Kuwana (JP); Masaru Kano, Yokkaichi (JP); Naoya Sasaki, Gifu (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 229 days.

(21) Appl. No.: 17/804,946

(22) Filed: Jun. 1, 2022

(65) Prior Publication Data
US 2022/0294299 A1    Sep. 15, 2022

Related U.S. Application Data

(63) Continuation of application No. PCT/JP2020/032938, filed on Aug. 31, 2020.

(30) Foreign Application Priority Data

Dec. 23, 2019    (JP) ................. 2019-231461

(51) Int. Cl.
*H02K 3/28*    (2006.01)
*H02K 1/16*    (2006.01)
(Continued)

(52) U.S. Cl.
CPC ............ *H02K 3/345* (2013.01); *H02K 1/16* (2013.01); *H02K 3/12* (2013.01); *H02K 3/28* (2013.01)

(58) Field of Classification Search
CPC .. H02K 3/12; H02K 3/28; H02K 3/04; H02K 3/345; H02K 3/325; H02K 3/522;
(Continued)

(56) References Cited

U.S. PATENT DOCUMENTS

2015/0244233 A1    8/2015  Hattori
2018/0254673 A1*   9/2018  Koizumi ............ H02K 3/48

FOREIGN PATENT DOCUMENTS

JP    2005-304167 A    10/2005
JP    2006-67763 A     3/2006
(Continued)

OTHER PUBLICATIONS

International Search Report issued Nov. 10, 2020 in PCT/JP2020/032938, filed on Aug. 31, 2020, 2 pages.

*Primary Examiner* — Bryan R Perez
(74) *Attorney, Agent, or Firm* — Maier & Maier, PLLC

(57) ABSTRACT

According to one embodiment, a stator includes a stator core and a stator coil. The stator core includes an annular yoke, and a plurality of teeth each extending from an inner periphery of the yoke in a radial direction and arranged in a circumferential direction of the yoke at intervals, in which a gap between a pair of teeth adjacent to each other in the circumferential direction forms a slot extending in the radial direction. With respect to the pair of teeth and the slot, only one of the teeth includes a convex holder-shaped part which projects in the slot toward the other tooth and extends in an axial direction. The stator coil includes a plurality of linear conductors aligned in the radial direction in the slot and held in the slot by the holder-shaped part.

7 Claims, 7 Drawing Sheets

(51) Int. Cl.
*H02K 3/12* (2006.01)
*H02K 3/34* (2006.01)

(58) Field of Classification Search
CPC .......... H02K 1/16; H02K 1/148; H02K 1/165;
H02K 1/146; H02K 1/27; H02K 1/04;
H02K 1/2791; H02K 1/14; H02K 1/20
See application file for complete search history.

(56) References Cited

FOREIGN PATENT DOCUMENTS

| | | | |
|---|---|---|---|
| JP | 2009-106023 | A | 5/2009 |
| JP | 2013-143819 | A | 7/2013 |
| JP | 2014-57460 | A | 3/2014 |
| JP | 2014-217136 | A | 11/2014 |

\* cited by examiner

STATOR AND ROTARY ELECTRIC MACHINE

CROSS-REFERENCE TO RELATED APPLICATIONS

This application is a Continuation application of PCT Application No. PCT/JP2020/032938, filed Aug. 31, 2020, and based upon and claiming the benefit of priority from Japanese Patent Application No. 2019-231461, filed Dec. 23, 2019, the entire contents of all of which are incorporated herein by reference.

FIELD

Embodiments described herein relate generally to a stator of a rotary electric machine and a rotary electric machine.

BACKGROUND

In general, rotary electric machines comprises a cylindrical stator, and a columnar-shaped rotor rotatably supported inside the stator. The stator includes a stator core and a coil wound around the stator core. A plurality of slots are provided at the stator core, and a plurality of linear conductors forming the coil are inserted into each slot while being aligned in the radial direction of the stator core. A pair of holder projections project into each slot. When the linear conductor positioned in the inner peripheral side engages the pair of holder projections, the linear conductors are held within each slot.

In order to reinforce insulation between the coil (linear conductors) and the stator core, a sheet-shaped insulator is provided in the periphery of a plurality of coil segments in the slot.

The stator structured as above may cause magnetic flux leakage between the pair of holder projections. The magnetic flux leakage may generate eddy current inside the coil which is a potential cause of deterioration in the performance of the rotary electric machine. Or, the rotary electric machine would require enlargement in order to compensate deterioration of the performance. Furthermore, when a pair of holder projections is adopted, the shape of insulator disposed in the slot becomes complicated, and maintaining the shape of receiver part through which the linear conductors are inserted becomes difficult.

DETAILED DESCRIPTION

Figure 1:
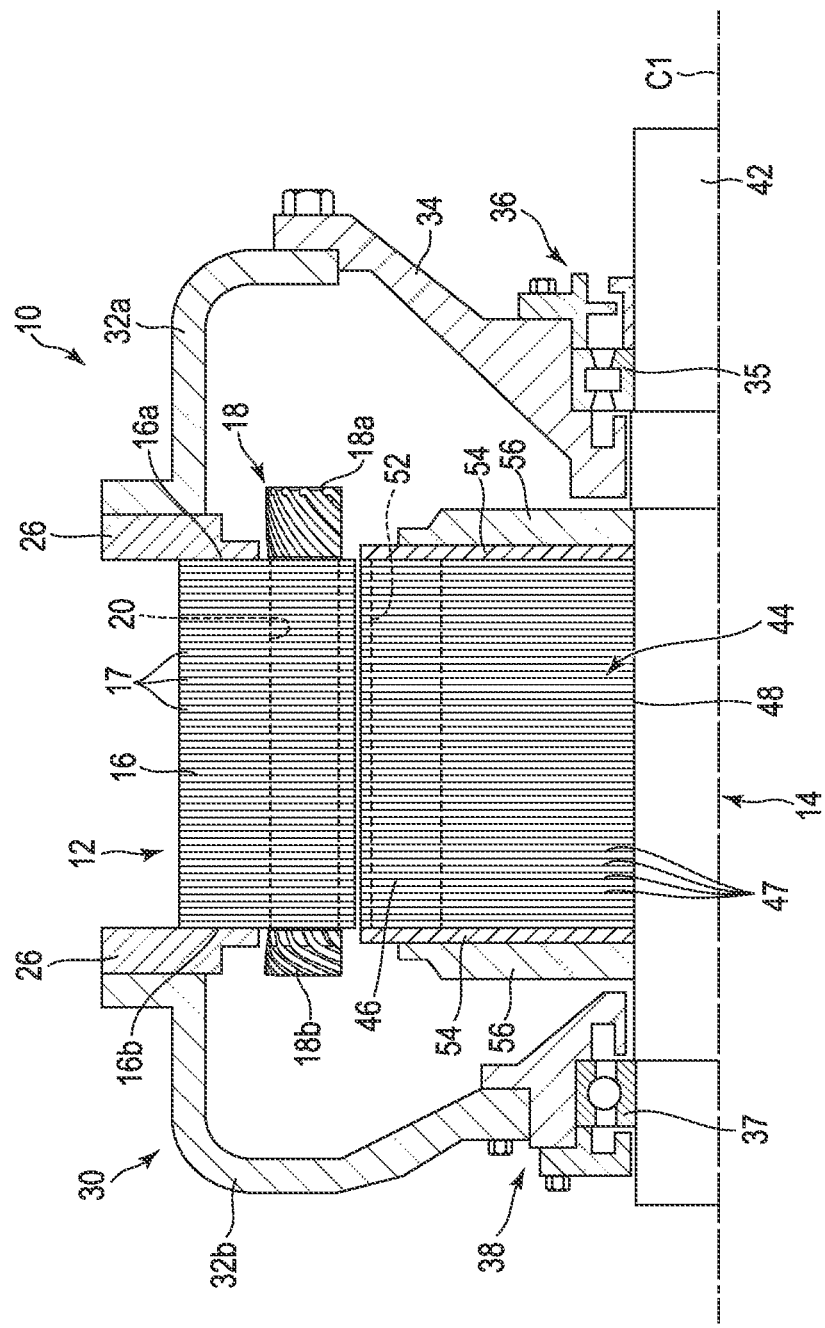
FIG. 1 is a longitudinal sectional view of a rotary electric machine of a first embodiment.

Embodiments will be described hereinafter with reference to the accompanying drawings. In general, according to one embodiment, a stator comprises a stator core including an annular yoke, and a plurality of teeth each extending from an inner periphery of the yoke in a radial direction and arranged in a circumferential direction of the yoke at intervals, in which a gap between a pair of teeth adjacent to each other in the circumferential direction forms a slot extending in the radial direction, and with respect to the pair of teeth and the slot, only one of the teeth including a convex holder-shaped part which projects in the slot toward the other tooth and extends in an axial direction of the yoke; and a stator coil wound around the stator core, the stator coil including a plurality of linear conductors aligned in the radial direction in the slot and held in the slot by the holder-shaped part.

The disclosure is merely an example, and proper changes within the spirit of the invention, which are easily conceivable by a skilled person, are included in the scope of the invention as a matter of course. In some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same or similar elements as or to those described in connection with preceding drawings or those exhibiting similar functions are denoted by like reference numerals, and a detailed description thereof is omitted unless otherwise necessary.

First Embodiment

Figure 2:
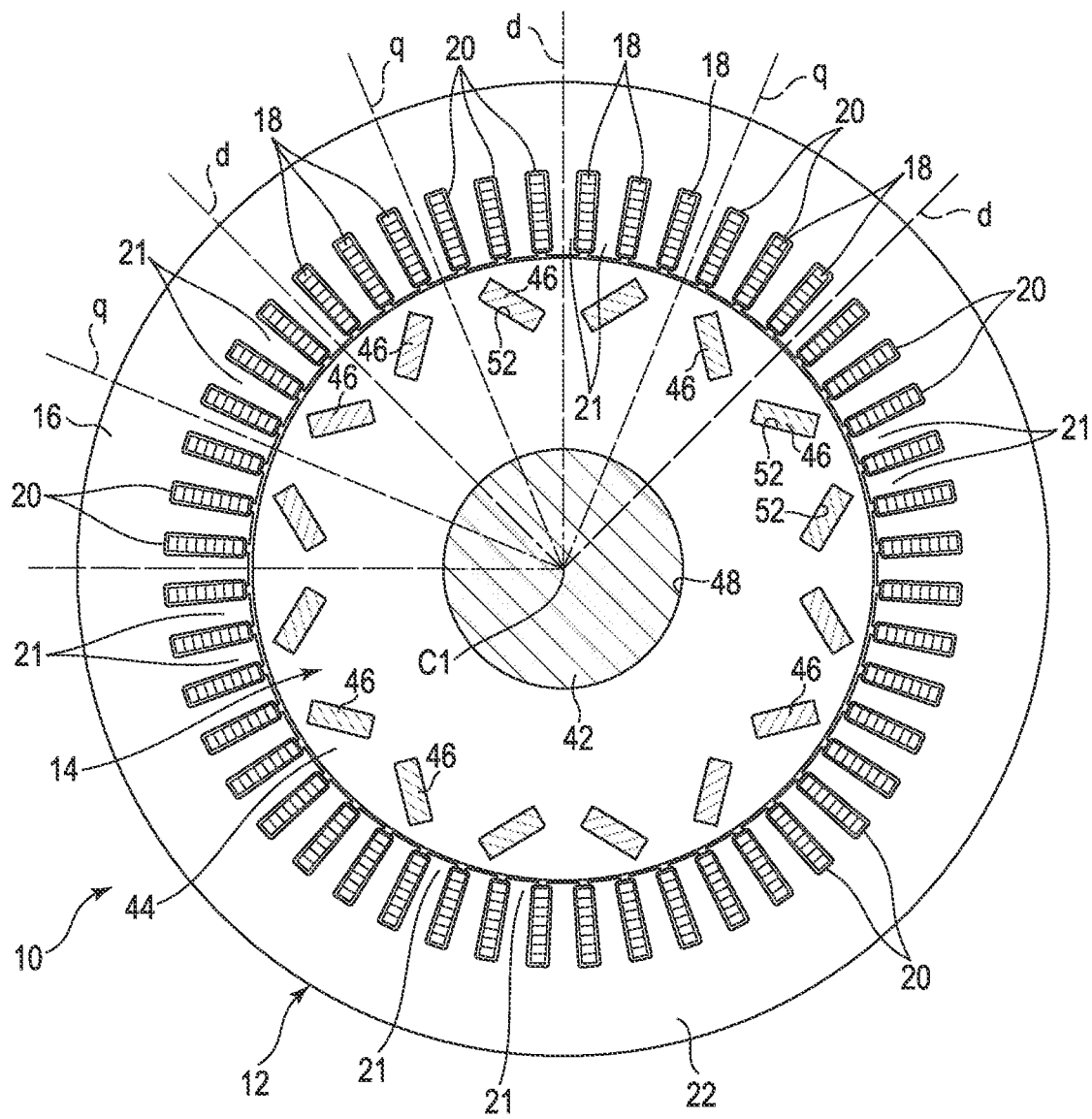
FIG. 2 is a cross-sectional view of the rotary electric machine of the first embodiment.

FIG. 1 is a longitudinal sectional view of a rotary electric machine of a first embodiment, illustrating only one half of the machine, centered on a central axis line C1. FIG. 2 is a cross-sectional view of the rotary electric machine.

As in FIG. 1, a rotary electric machine 10 is structured as, for example, a permanent magnet type rotary electric machine. The rotary electric machine 10 comprises an annular or cylindrical stator 12, a rotor 14 supported inside the stator 12 to be rotatable around the central axis line C1 and coaxially with the stator 12, and a casing 40 supporting the stator 12 and the rotor 14.

In the following description, a direction of extension of the central axis line C1 will, be referred to as axial direction, a direction of rotation around the central axis C1 will be referred to as circumferential direction, and a direction orthogonal to the axial and circumferential directions will be referred to as radial direction.

As in FIGS. 1 and 2, the stator 12 comprises a cylindrical stator core 16 and a stator winding (coil) 18 wound on the stator core 16. The stator core 16 is structured with a number of ring-shaped electromagnetic steel plates 17 formed of a magnetic material, for example, silicon steel, laminated in a concentric manner. The number of electromagnetic steel plates 17 are connected to each other in a laminated manner by welding multiple points on the outer peripheral surface of the stator core 16. The stator core 16 has an inner peripheral surface located coaxially with the central axis line C1, first end surface 16a located at one end of the axial direction, and second end surface 16b located at the other end of the axial direction. The first end surface 16a and the second end surface 16b extend orthogonally to the central axis line C1.

The stator core 16 includes, integrally, an annular yoke 22, and a plurality (e.g., 48 in the present embodiment) of teeth 21 each extending from the inner circumference of the yoke 22 in the radial direction toward the central axis line C1, and arranged at equal intervals in the circumferential direction. A slot 20 extending in the radial direction is formed by a gap between a pair of teeth 21 adjacent to each other in the circumferential direction. The slots 20 are aligned at regular intervals in the circumferential direction. In the present embodiment, each slot 20 has an opening that opens on the inner peripheral surface of the stator core 16. Each slot 20 extends radially (outward in the radial direction with respect to the central axis of the stator core 16) from the inner peripheral surface side of the stator core 16. Each slot 20 extends over the entire length in the axial direction of the stator core 16. One end of the axial direction of each slot 20 is open to the first end surface 16a, and the other end of the axial direction is open to the second end surface 16b. Note that, the inner peripheral end of each slot 20 may be structured such that it does not open in the inner peripheral side of the stator core 16, and the inner peripheral surface of the stator core 16 may be made as a cylindrical surface.

Coils 18 are inserted into the slots 20, and wrapped around each of the teeth 21. The coil 18 is structured to include coil ends 18a and 18b extending outward in the axial direction from the first end surface 16a and the second end surface 16b of the stator core 16. By applying alternating current to the coils 18, a predetermined stranded magnetic flux is formed in the stator core 16 (teeth 21).

As in FIG. 1, a core holder 26 is provided at both ends of the axial direction of the stator core 16. The casing 40 includes a substantially cylindrical first bracket 32a, and a bowl-shaped second bracket 32b. The first and second brackets 32a and 32b are formed of aluminum alloy, for example. The first bracket 32a is connected to the core holder 26 positioned in the drive end side of the stator core 16. An annular bearing bracket 34 is bolted coaxially to the distal end of the first bracket 32a. A first bearing housing 36, which contains, for example, a roller bearing as a first bearing 35, is fastened to the center of the bearing bracket 34.

The second bracket 32b is connected to the core holder 26 positioned in the counter-drive end side. A second bearing housing 38, which contains, for example, a ball bearing as a second bearing 37, is fastened to the center of the second bracket 32b.

On the other hand, the rotor 14 includes a columnar-shaped shaft (rotating shaft) 42, cylindrical rotor core 44 fixed to approximately the center of the axial direction of the shaft 42, and a plurality of permanent magnets 46 embedded in the rotor core 44. The rotating shaft 42 is supported at both ends of the axial direction by the first and second bearings 35 and 37, respectively, and is rotatable about the central axis line C1. The rotor core 44 is formed as a laminate layer core including a large number of circular electromagnetic steel plates 47 formed of magnetic material, for example, silicon steel, laminated on each other concentrically. The rotor core 44 has an inner hole 48 formed coaxially with the central axis line C1. The shaft 42 is inserted and fitted into the inner hole 48, and extends coaxially with the rotor core 44. A magnetic shielding plate 54 and a rotor core holder 56 are provided at both ends of the rotor core 44 in the axial direction.

As in FIGS. 1 and 2, the rotor core 44 is coaxially located inside the stator core 16, and the outer periphery of the rotor core 44 faces the inner periphery of the stator core 16 (the distal end surface of the teeth 21) with a small gap (air gap) therebetween.

The rotor core 44 has a plurality of magnet embedding holes 52 that penetrate the rotor core 44 in the axial direction. In each magnet hole 52, a permanent magnet 46 is loaded and placed, and fixed to the rotor core 44 by, for example, adhesives. Each permanent magnet 46 extends over the entire length of the rotor core 44. The permanent magnets 46 are arranged at predetermined intervals in the circumferential direction of the rotor core 44.

As in FIG. 2, the rotor core 44 has a d-axis extending in the semi-radial direction or radial direction of the rotor core 44, and a q-axis spaced 90° electrically in the circumferential direction with respect to the d-axis. In this example, the q-axis is the axis extending radially through the boundary between adjacent magnetic poles and the central axis line C1, and the d-axis is the direction electrically perpendicular to the q-axis. The d-axis and q-axis are provided alternately and in predetermined phases in the circumferential direction of the rotor core 44.

In the circumferential direction of the rotor core 44, two magnet embedding holes are formed on both sides of each d-axis. The embedding holes 52 have an almost rectangular cross-sectional shape and are inclined to the d-axis. When viewed in a plane perpendicular to the central axis line C1 of the rotor core 44, the two embedding holes 52 are arranged in an almost V-shape, for example.

A permanent magnet 46 is loaded into each embedding hole 52, and embedded in the rotor core 44. The permanent magnet 46 is, for example, formed in the form of an elongated flat plate with a rectangular cross section, and has a length approximately equal to the axial direction length of the rotor core 44. The permanent magnet 46 may include a combination of magnets divided into a plurality in the axial direction (longitudinal direction) or circumferential direction (width direction), and in this case, the magnets are formed so that the total length thereof is approximately equal to the axial direction length of the rotor core 44. Each permanent magnet 46 is embedded over almost the entire length of the rotor core 44. The magnetization direction of the permanent magnets 46 is orthogonal to the surface and back surface of the permanent magnets 46. The two permanent magnets 46 located on both sides of each d-axis are arranged in an almost V-shape. That is, the two permanent magnets 46 are arranged so that the distance thereof from the d-axis gradually increases as they move from the inner peripheral end to the outer peripheral end. The two permanent magnets 46 located on both sides of the d-axis are arranged so that their magnetization directions are opposite in the circular circumferential direction of the rotor core 44. The two permanent magnets 46 located on both sides of the q-axis are arranged so that the magnetization direction is the same.

By arranging the permanent magnets 46 as described above, the area on each d-axis at the outer periphery of the rotor core 44 is formed about one magnetic pole. In the present embodiment, the rotary electric machine 10 includes right poles (four-pole pair) in which the front and back sides of N poles and S poles of the permanent magnets 46 are alternately arranged for each adjacent one pole, that is, 48 slots, in order to form a permanent magnet rotary electric machine wound with single layer distributed winding.

Now, the structure of the stator 12 will be explained.

Figure 3:
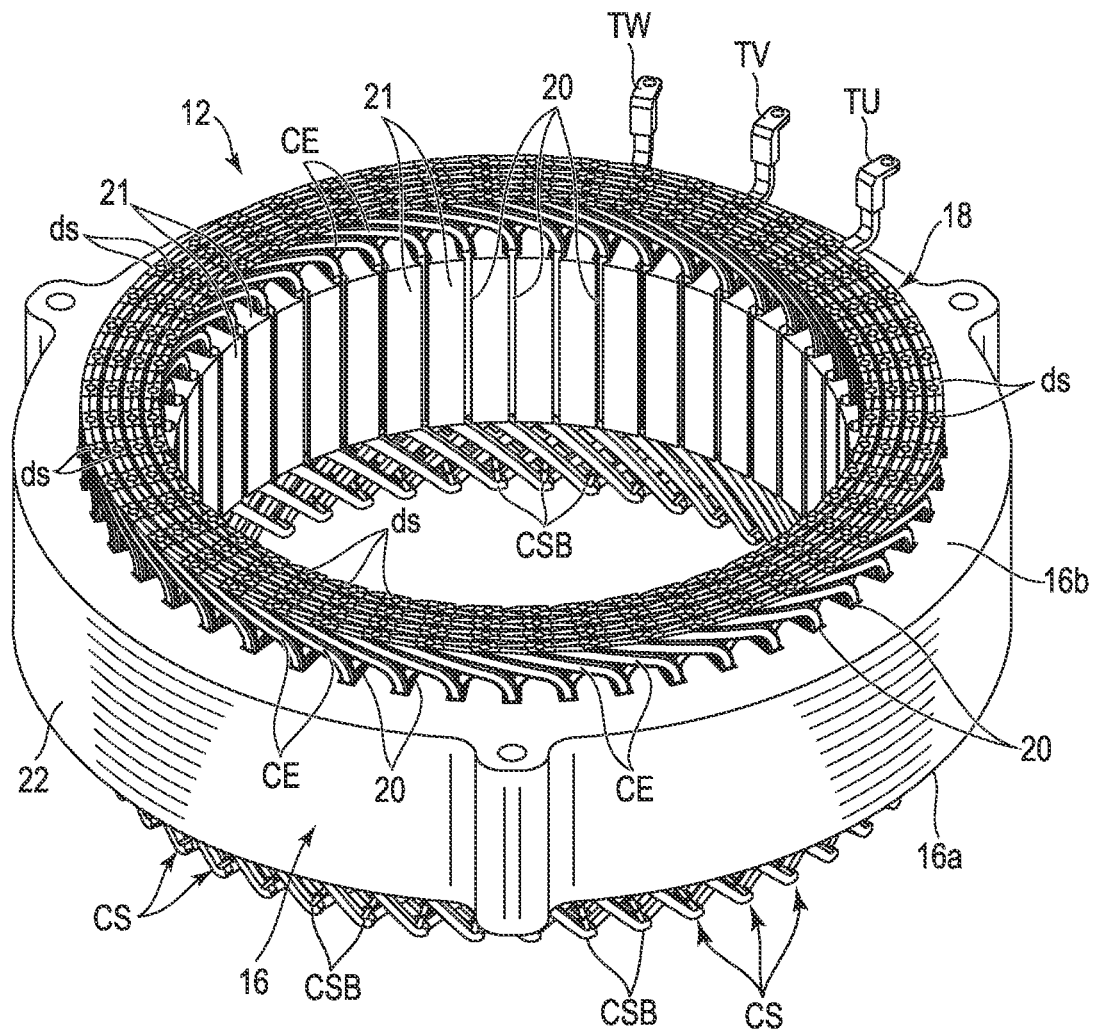
FIG. 3 is a perspective view illustrating a first end surface side of a stator of the rotary electric machine.
Figure 4:
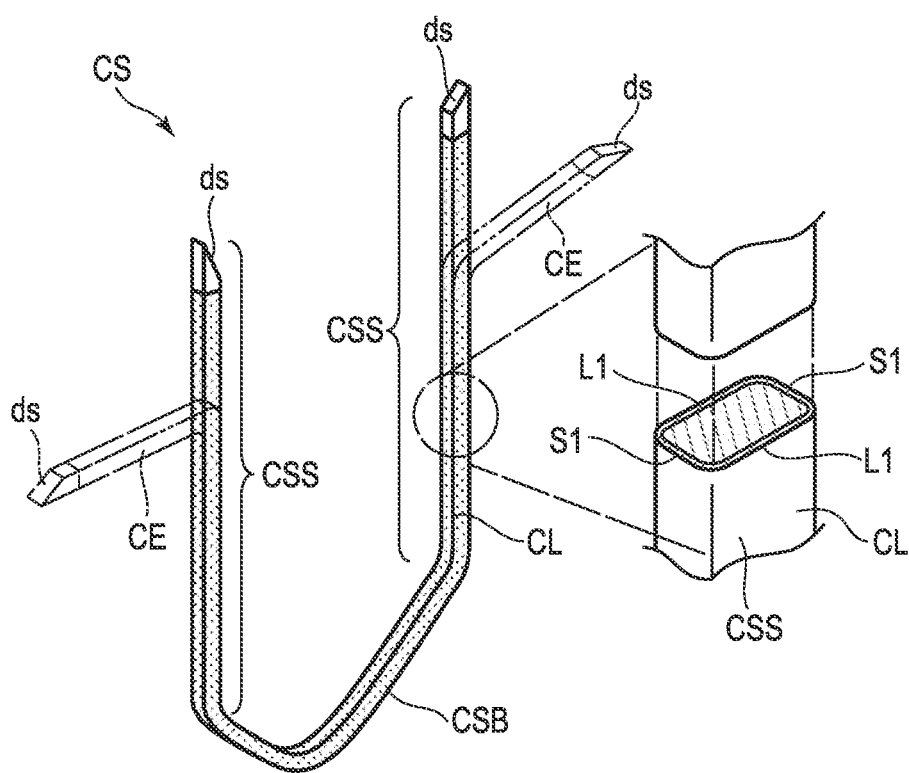
FIG. 4 is a perspective view illustrating a coil segment of a coil of the stator.

FIG. 3 is a perspective view illustrating a second end surface side of the stator, and FIG. 4 is a diagram illustrating an example of a coil segment.

The coil 18 includes a plurality of coil segments CS formed of rectangular conductors or rectangular wires, for example, as linear conductors, and is assembled on the stator core 16.

As in FIG. 4, the coil segment CS is formed into an almost U-shape by cutting and bending a rectangular conductor (rectangular wire). That is, the coil segment CS integrally includes a pair of linear parts (linear conductors) (CSS) facing each other at intervals, and a bridge part CSB connecting one end of the linear part CSS to the other. The coil segment CS has a rectangular cross section (transverse cross section) perpendicular to the longitudinal direction. The transverse cross section has a pair of long sides L1 facing each other and a pair of short sides S1 facing each other. The outer surface of the coil segment CS is covered with an insulating coating CL such as insulating varnish. The extension end of each linear part CSS has the coating removed to form a conductive part that can be conducted. The extension end of each linear part CSS is cut diagonally to form a rectangular joint surface dS that is inclined with respect to the longitudinal direction of the linear part CSS.

If the cross-section of the rectangular conductor is rectangular, the four corners need not be right-angled and may be chamfered or R-processed. When the cross-section has two opposite long sides, for example, an ellipse, the part connecting the ends of these two opposite long sides in the cross-section may be a curve. Furthermore, a linear conductor is not limited to a rectangular conductor, but may be a conductor with a circular or oval cross-section.

As in FIG. 3, as to the coil segments CS, the pair of linear parts CSS are inserted into different slots 20 from the first end surface 16a side of the stator core, for example, and protrude from the second end surface 16b of the stator core 16 by a predetermined length. Multiple, for example, eight linear parts CSS are inserted into one slot 20. In the slot 20, the eight linear parts CSS extend in the axial direction of the stator core 16, respectively, and are arranged in the radial direction of the stator core 16.

The bridge part CSB of the coil segment CS is opposed to the first end surface 16a of the stator core 16 with a small gap. The bridge part CSB extends in a substantially circumferential direction of the stator core 16, and some bridge parts CSB extend across other bridge parts CSB. The bridge parts CSB structure the coil end 18a protruding from the first end surface 16a.

On the second end surface 16b side of the stator core 16, the extension part CE of the linear part CSS protruding from the second end surface 16b in the axial direction by a predetermined length is bent in the circumferential direction of the stator core 16, and extends inclining with respect to the axial direction. The extension part CE of the linear part CSS is bent such that the joint surface (distal end surface) ds thereof extends substantially parallel to the second end surface 16b.

The extension parts CE of the eight linear parts CSS inserted into each slot 20 are bent alternately in one direction and in the opposite direction. That is, the extension part CE positioned at the outermost circumference is bent in one direction of the circumferential direction of the stator core 16 while the extension part CE positioned in one inner side is bent in the other direction of the circumferential direction (reverse direction). The extension part CE positioned in further one inner side is bent in the above mentioned one direction. The joint surfaces ds of the eight extension parts CE extending from the different slots 20 are located substantially in a row along the radial direction of the stator core 16. The eight joint surfaces ds extend over substantially the same plane.

The joint surfaces ds of the eight extension parts CE in each row are welded together, two by two, and electrically and mechanically joined. By joining multiple extension parts CE to each other, a continuous coil 18 is formed. For example, laser welding can be used for welding. The welded part or the jointed part is covered with an insulating material such as powder coating or varnish. The extension part CE of the linear parts CSS forms the coil end 18b that protrudes from the second end surface 16b. In the coil 18, U-phase connection terminal TU, V-phase connection terminal TV, and W phase connection terminal TW are connected to the three coils.

Now, the structure of the slots 20 and teeth 21 of the stator core 16 will be explained.

Figure 5:
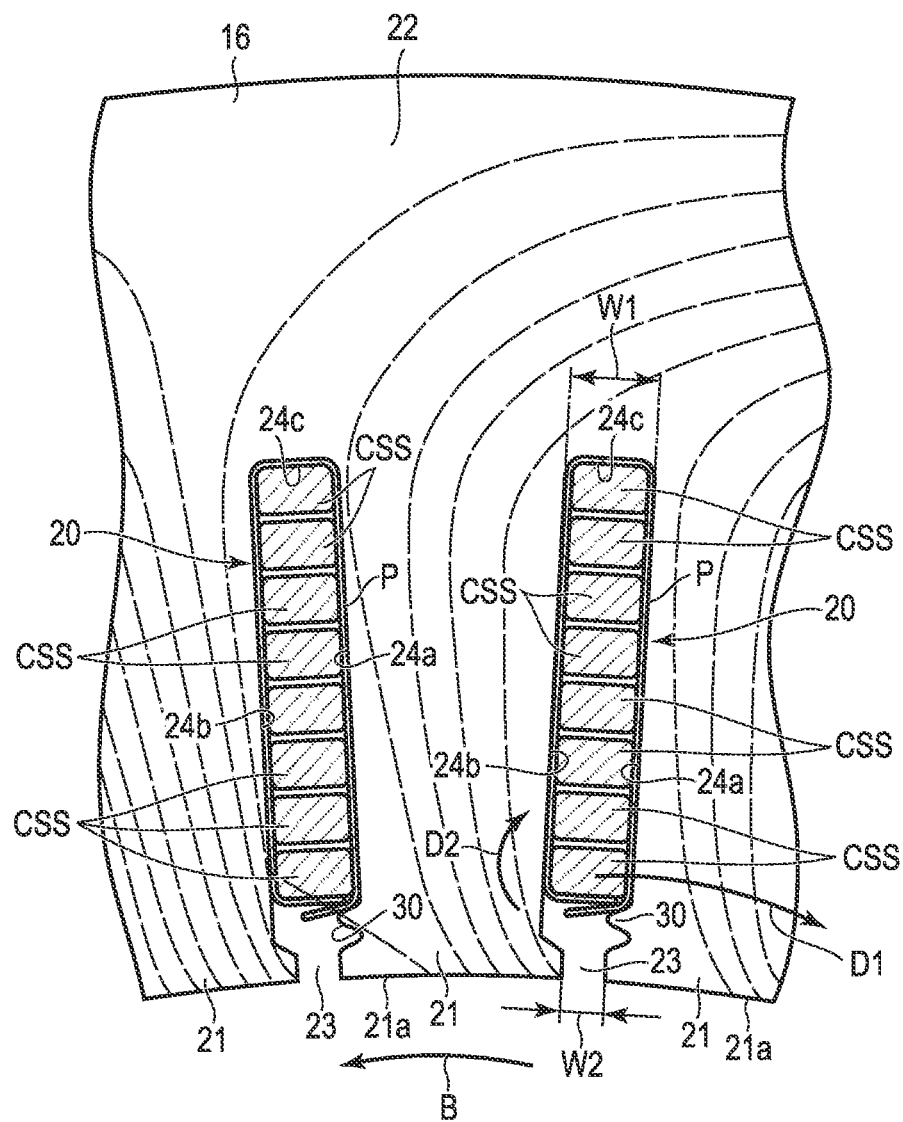
FIG. 5 is a cross-sectional view illustrating a slot of the stator in an enlarged manner.
Figure 6:
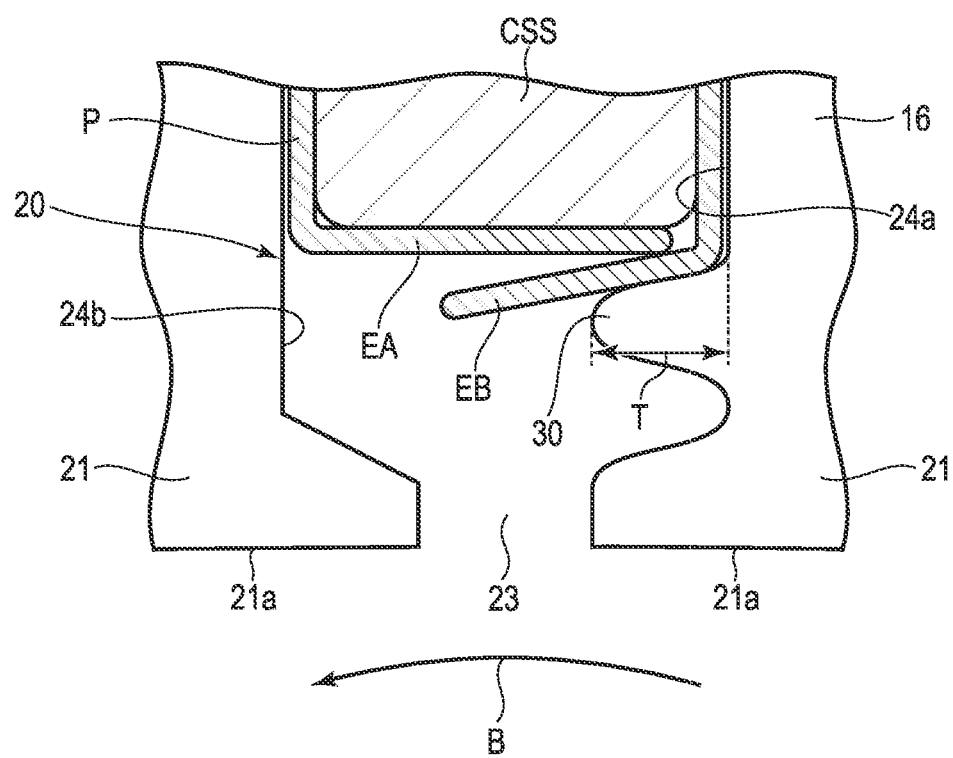
FIG. 6 is a cross-sectional view illustrating a part of the slot in an enlarged manner.

FIG. 5 is a cross-sectional view illustrating a slot part of the stator core, in an enlarged manner, and FIG. 6 is a cross-sectional view illustrating a part of the slot part, in an enlarged manner. In FIG. 5, two dotted and dashed lines indicate the magnetic flux lines.

As in FIG. 5, the slot 20 of the stator core 16 has an elongated rectangular cross-sectional shape that extends radially about the central axis line C1. The inner peripheral side end of the slot 20 opens into the inner periphery of the stator core 16, forming an opening end 23. The slot 20 includes a first side surface (side of the teeth 21) 24a extending from the opening end 23 in the substantially radial direction of the stator core 16, and a second side (side of the other teeth) 24a extending from the opening end 23 in the substantially radial direction of the stator core 16, while being opposed to the first side surface 24a in the circumferential direction with a gap, and a bottom surface (end surface) 24c connected to the extension ends of the first side surface 24a and the second side surface 24b to be opposed to the opening end 23 in the radial direction. The width (gap between the first side surface 24a and the second side surface 24b) W1 in the circumferential direction of the slot 20 is greater than the width W2 in the circumferential direction of the opening end 23.

When a pair of teeth 21 adjacent to each other in the circumferential direction and the slot 20 between the pair of teeth 21 in the stator core 16 are considered, one of the teeth 21 includes a convex holder-shaped part (holder projection) 30 which protrudes into the slot 20 toward the other teeth 21 and extends in the axial direction. That is, the stator core 16 includes a holder projection 30 protruding from one of the first side surface 24a and the second side surface 24b into the slot 20.

In the present embodiment, the holder projection 30 is provided only at the first side surface 24a of one of the teeth 21, and protrudes from the first side surface 24a toward the second side surface 24b. Given that the direction of torque (direction of torque generation) in which the maximum torque and maximum output of the rotary electric machine 10 are required is the direction of arrow B (counterclockwise direction corresponding to the rotation direction of the rotor 14 in the present embodiment), the holder projection 30 is provided only at the first side surface 24a located upstream in the torque direction B. That is, the holder projection 30 protrudes from one side surface of the slot 20 in the torque direction B.

The holder projection 30 extends over the entire length in the axial direction of the stator core 16. The holder projection 30 is located at a distance apart from the inner peripheral end (opening end 23) of the slot 20 outward in the radial direction. At the tip end of the slot 20, a tip (convex part) 21c is formed that is continuous with the distal end surface 21a of the teeth 21, and the holder projection 30 described above is located at a distance apart from the tip 21c outward in the radial direction. Therefore, the holder projection 30 does not have a surface that is continuous with the distal end surface 21a of the teeth 21. A projection height T (cf. FIG. 6) of the holder projection 30 is, for example, about 20 to 40% of the width W1 of the slot 20. In the second side surface 24b of the other teeth 21, the area opposed to the holder projection 30 is formed flat without protrusion.

Note that, in the present embodiment, the holder projection 30 is disposed in the same position to the same direction in each of the teeth 21.

For example, eight linear parts (linear conductors) CSS are inserted into one slot 20. In the slot 20, the eight linear parts CSS extend in the axial direction of the stator core 16, respectively, and are aligned in the radial direction. When viewed in a transverse cross section, the eight linear parts CSS are arranged in the slot 20 with their long sides L1 facing each other in parallel. The short side of each linear parts CSS faces the first or second side 24a or 24b.

As in FIGS. 5 and 6, in the slot 20, a sheet-shaped insulator, for example, insulating paper P, is wound around the periphery of the eight linear parts CSS. The insulating paper P is placed in the slot 20 in advance, and the linear parts CSS are inserted into the slot 20 where the insulating paper P is placed. The insulating paper P is placed along the first side 24a, bottom surface 24c, and the second side surface 24b of the slot 20. One end (first end) EA and the other end (second end) EB of the insulating paper P are located on the opening end 23 side. The first end EA bends into the slot 20 from the second side surface 24b side, and is located overlapping the long side of the linear part CSS located on the innermost side. That is, the first end EA is positioned on the side surface of the linear part CSS facing the holder projection 30.

The second end EB is bent into the slot 20 along the holder projection 30 from the first side surface 24a side. The second end EB is located overlapping or facing the first end EA with a gap therebetween. The insulating paper P arranged as above increases the insulation of the coil 18 with respect to the outside, and also physically protects the coil 18.

Of the eight linear parts CSS, the corner of the linear part CSS located on the innermost side (corner of the first side surface 24a side and the opening end 23 side) contacts the holder projection 30 through the insulating paper P. The eight linear parts CSS are held between the holder projection 30 and the bottom surface 24c of the slot 20, and are positioned in the radial direction. At the same time, the eight linear parts CSS are held between the first side surface 24a and the second side surface 24b, and are positioned in the circumferential direction. In the slot 20, the portion where the eight linear parts CSS are located is formed to a certain width W1, and the width narrows at the holder projection 30, such that the linear part CSS is held between the holder projection 30 and the bottom surface 24c.

According to the rotary electric machine of the first embodiment structured as described above, the holder projection 30 protruding into the slot 20 is installed only on one of the pair of teeth 21, and thus, the magnetic flux leaking into the slot 20, that is, the magnetic flux that flows across the slot 20 and the coil segment CS, can be significantly reduced, as shown by the two-dots and dashed lines in FIG. 5. Thereby, possible eddy current generated in the stator coil 18 can be suppressed, and the torque and output can be increased. Since the number of holder projections is reduced from two to one, it is possible to reduce the weight of the stator core.

Furthermore, when the holder projection 30 is provided only on one side of the slot 20, the shape of the insulation paper P to be installed in the slot 20 is simplified, and thus, the receiver part for inserting the linear conductors of the coil can be easily secured.

When bending the extension part CE of the coil segment CS in the circumferential direction of the stator core 16, for example, as in FIG. 5, when the extension part CE of the linear part CSS located at the innermost periphery side is bent along the circumferential direction around the rotation axis in the clockwise direction D1, a rotational force is generated in the linear part CSS in the clockwise direction D2 around the central axis. In this case, with the holder projection 30 installed in the first side surface 24a, which is located in the clockwise direction D1 with respect to the second side 24b as in this embodiment, that is, with the holder projection 30 provided on a tooth 21 (first side surface 24a) of the pair of teeth 21, positioned in the same side as the bending direction of the extension part CE, torsional deformation of the linear conductor (linear part CSS) can be suppressed. This makes it possible to prevent damage to the insulating paper P caused by torsional deformation of the linear conductor and the linear conductor from falling out of the slot opening end.

Next, a rotary electric machine of another embodiment will be described. In the following embodiment, the same reference numbers are used for the same parts as in the first embodiment described above to omit or simplify the detailed description thereof, and the detailed description will focus on the parts that differ from the first embodiment.

Second Embodiment

Figure 7:
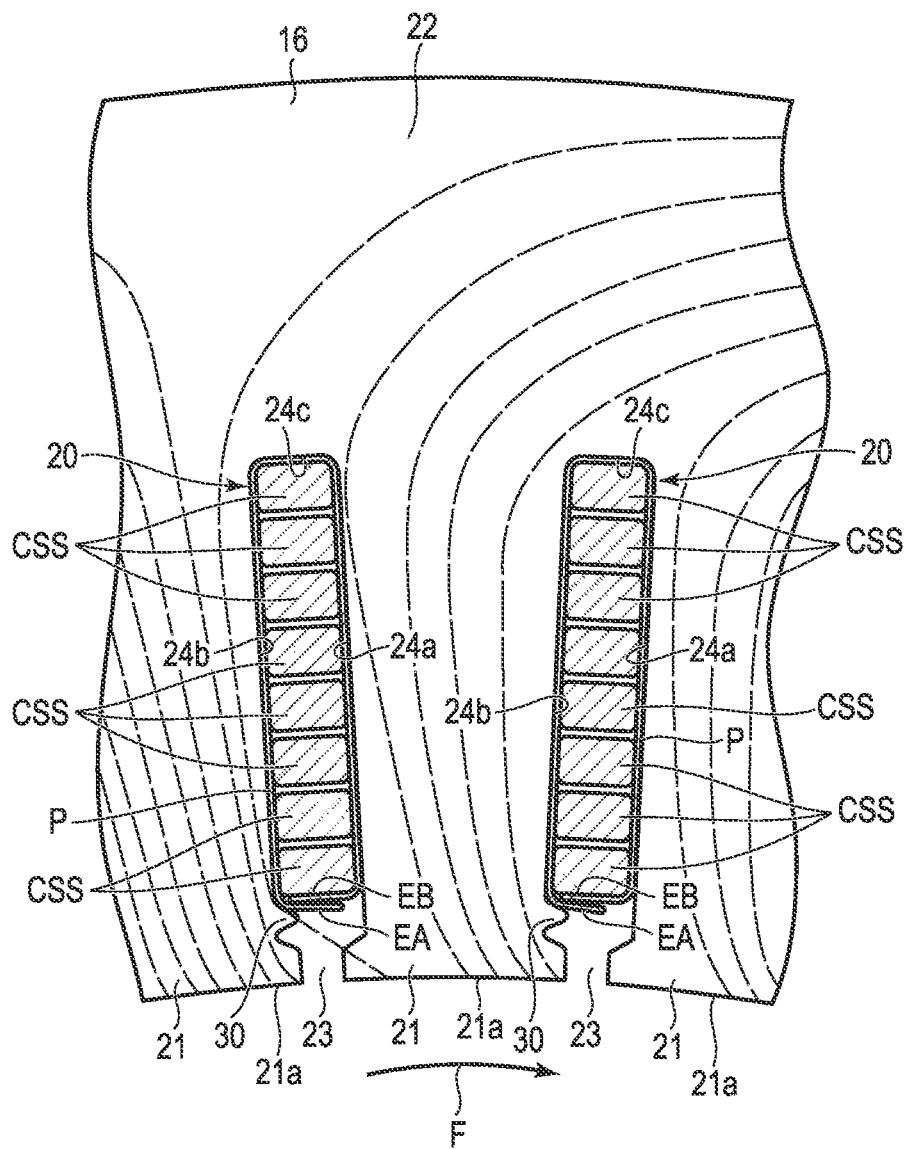
FIG. 7 is a cross-sectional view illustrating a slot part of a stator of a rotary electric machine of a second embodiment, in an enlarged manner.

FIG. 7 is a cross-sectional view of a part of a stator core of a rotary electric machine of a second embodiment.

According to the present embodiment, only one of the pairs of teeth 21 adjacent to each other in the circumferential direction includes a holder projection 30. Here, among the pair of side surfaces 24a and 24b of the slot 20, the holder projection 30 is provided only on the second side surface 24b of one of the teeth 21. The holder projection 30 protrudes from the second side surface 24b toward the first side surface 24a. For example, if the torque direction in which the rotary electric machine 10 is frequently used (the regenerative torque direction, for example) is the clockwise direction F, the holder projection 30 is installed only on the tooth 21 (second side surface 24b) of the pair of teeth 21, located upstream of the torque direction F. The holder projection 30 extends over the entire length of the axial direction of the stator core 16. Furthermore, the holder projection 30 is disposed to be apart from the inner periphery end (opening end 23) of the slot 20 and the tip 21c outward the radial direction. The protrusion height T of the holder projection 30 is, for example, about 20 to 40% of the width W1 of the slot 20. In the first side surface 24a of the other tooth 21, the area opposed to the holder projection 30 is formed flat without protrusion.

In the slot 20, insulating paper P is wrapped around the periphery of the eight linear parts CSS. The insulating paper P is disposed along the first side 24a, bottom surface 24c, and second side 24b of the slot 20. One end (first end) EA and the other end (second end) EB of the insulating paper P are located on the opening end 23 side. The second end EB is bent into the slot 20 from the first side 24a side, and overlaps the long side (side facing the holder projection 30) of the linear part CSS located in the innermost side. The first end EA bends from the second side surface 24b side into the slot 20 along the holder projection 30, and extends passing between the holder projection 30 and the first end EA. Furthermore, the second end EA is located overlapping or facing the second end EB with a gap therebetween.

Of the eight linear parts CSS, the linear part CSS located in the innermost side contacts the holder projection 30 through the insulating paper P. The eight linear parts CSS are sandwiched between the holder projection 30 and the bottom surface 24c of the slot 20, and held in the slot 20 positioned in the radial direction. At the same time, the eight linear parts CSS are sandwiched between the first side 24a and the second side 24b, and positioned in the circumferential direction.

In the second embodiment, the other components of the rotary electric machine are the same as those of the rotary electric machine of the first embodiment described above.

According to the above second embodiment, the holder projection 30 is installed only on the second side surface located upstream of the torque direction F, which is frequently used, the total amount of magnetic flux leaking into the slot 20, that is, the total amount of magnetic flux passing between the teeth 21 across the slot 20 and the coil, segment CS can be greatly reduced. As a result, the generation of eddy currents in the stator coil 18 can be suppressed, and torque and output can be improved. Other effects similar to those of the first embodiment described above can be obtained in the second embodiment.

When applied to a rotary electric machine in which the direction of rotation is restricted to one direction, it is preferable to install a convex holder projection only on the teeth located upstream of the direction of rotation, with respect to a pair of adjacent teeth.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the second embodiment, the case in which the direction of rotation is limited to one direction has been described, but if the torque to be generated in the rotary electric machine is limited to one direction, it is sufficient to install a convex holder projection only on the upstream side tooth of the pair of teeth adjacent to the circumferential direction.

In the above-mentioned embodiment, among a pair of adjacent teeth, a holder projection is provided only on the tooth located upstream in the torque direction, but no limitation is intended thereby, and a convex holder projection may be installed only on the tooth located downstream in the torque direction. In this structure, the same effect as in the above-mentioned embodiment can be obtained, and in addition, the effect of iron loss reduction can be obtained.

In the aforementioned embodiment, the holder projection 30 is provided in the same orientation for each of the plurality of teeth 21, but no limitation is intended thereby. That is, with respect to adjacent slots, it is not necessary that the tooth with the holder projection may not be in the same side. For example, the holder projections may be installed in different directions alternately for each of the N (1, 2, 3 . . . ) slots in the circumferential direction. Furthermore, holder projections may be provided in any orientation, whether regular or irregular.

The number of coil turns, and the number of coil segments are not limited to the above embodiments, and can be increased or decreased as appropriate. For example, it may be structured such that four or six segment linear parts are arranged in one slot. The dimensions, material, shape, etc., of the stator and holder projection are not limited to the aforementioned embodiments, and can be changed in various ways according to the design. The stator and rotary electric machine of the embodiments are not limited to permanent magnet rotary electric machines, but can also be applied to induction motors.

What is claimed is:

1. A stator comprising:
    a stator core including an annular yoke, and a plurality of teeth each extending from an inner periphery of the yoke in a radial direction and arranged in a circumferential direction of the yoke at intervals, in which a gap between a pair of teeth adjacent to each other in the circumferential direction forms a slot extending in the radial direction, and with respect to the pair of teeth and the slot, only one tooth of the pair of teeth including a convex holder-shaped part which is provided at a position apart from a distal end surface of the teeth outward in the radial direction, projects in the slot toward the other tooth, and extends in an axial direction of the yoke; and
    a stator coil wound around the stator core, the stator coil including a plurality of linear conductors aligned in the radial direction in the slot and held in the slot by the convex holder-shaped part.

2. The stator of claim 1, wherein the convex holder-shaped part is provided at the same position with respect to each of the teeth.

3. The stator of claim 2, further comprising a sheet-shaped insulator wound around the linear conductors in the slot, wherein the insulator includes a first end disposed on a side surface facing the convex holder-shaped part of the linear conductor positioned in an innermost peripheral side in the slot, and a second end extending in the slot passing between the first end and the convex holder-shaped part.

4. A rotary electric machine, comprising:
    a rotor rotatable about a central axis line; and
    a stator of claim 2 arranged around the rotor, wherein
    a rotation direction of the rotor is limited to a direction from a tooth with the convex holder-shaped part, among the pair of teeth, to the other tooth.

5. The stator of claim 1, wherein the plurality of linear conductors are held in the slot between the convex holder-shaped part and a bottom surface of the slot.

6. The stator of claim 1, wherein, with respect to the linear conductor adjacent to the convex_holder-shaped part, the linear conductor includes an extension part extending outward from the slot and bent in the circumferential direction of the stator core, and
    the holder-shaped part is provided at the tooth positioned in the bending direction of the extension part among the pair of teeth.

7. The stator of claim 1, further comprising a sheet-shaped insulator wound around the linear conductors in the slot, wherein the insulator includes a first end disposed on a side surface facing the convex holder-shaped part of the linear conductor positioned in an innermost peripheral side in the slot, and a second end extending in the slot passing between the first end and the convex holder-shaped part.

* * * * *